United States Patent [19]

Parker

[11] Patent Number: 4,484,226

[45] Date of Patent: Nov. 20, 1984

[54] AUTOMATIC KINESCOPE BIAS CONTROL SYSTEM COMPENSATED FOR KINESCOPE ELECTRON GUN CONDUCTION DISSIMILARITIES

[75] Inventor: Robert P. Parker, Indianapolis, Ind.

[73] Assignee: RCA Corporation, New York, N.Y.

[21] Appl. No.: 434,328

[22] Filed: Oct. 14, 1982

[51] Int. Cl.³ .................. H04N 9/20; H04N 9/535; H04N 5/68

[52] U.S. Cl. ................................ 358/242; 358/29; 358/65

[58] Field of Search .............. 358/242, 243, 29, 64, 358/65, 139, 168, 169; 307/352, 353; 328/150, 151, 168, 169, 171, 172, 175

[56] References Cited

U.S. PATENT DOCUMENTS

| | | | |
|---|---|---|---|
| 4,160,995 | 7/1979 | Jensen | 358/29 |
| 4,263,622 | 4/1981 | Hinn | 358/242 |
| 4,387,405 | 6/1983 | Hinn | 358/243 |
| 4,414,577 | 11/1983 | Tallant | 358/242 |

Primary Examiner—Tommy P. Chin
Attorney, Agent, or Firm—Eugene M. Whitacre; Paul J. Rasmussen; Ronald H. Kurdyla

[57] ABSTRACT

A color television receiver includes plural automatic kinescope bias (AKB) control systems respectively associated with plural electron guns of a kinescope which may exhibit mutually dissimilar electron gun conduction characteristics. Each AKB system includes circuit for deriving a signal representative of the electron gun black current magnitude, a source of auxiliary signal with a magnitude proportional to the bias of the associated electron gun during image blanking intervals, and a control network for providing a bias control signal to the associated electron gun to maintain a correct black current level. In order to maintain the correct black current levels of the electron guns in substantially the same mutual relationship as exhibited by the conduction characteristics of the electron guns, the control networks for each electron gun respond both to the magnitude of the associated derived signal and to the magnitude of the associated auxiliary signal.

8 Claims, 3 Drawing Figures

AUTOMATIC KINESCOPE BIAS CONTROL SYSTEM COMPENSATED FOR KINESCOPE ELECTRON GUN CONDUCTION DISSIMILARITIES

This invention concerns apparatus such as may be employed in a television receiver for automatically controlling the bias of a video signal image reproducing kinescope having plural electron guns. In particular, the invention concerns such apparatus wherein compensation is automatically provided for mutually different conduction characteristics of the kinescope electron guns.

Color television receivers sometimes employ an automatic kinescope bias (AKB) control system for automatically establishing proper black image representative current levels for each electron gun of a color kinescope associated with the receiver. As a result of this operation, pictures reproduced by the kinescope are prevented from being adversely affected by variations of kinescope operating parameters (e.g., due to aging and temperature effects). One type of AKB system is disclosed in U.S. Pat. No. 4,263,622 of Werner Hinn, titled "Automatic Kinescope Biasing System".

An AKB system typically operates during image blanking intervals, at which time each electron gun of the kinescope conducts a small black image representative blanking current in response to a reference voltage representative of black video signal information. This current is monitored by the AKB system to generate a signal which is representative of the currents conducted during the blanking interval, and which is used to maintain a desired black current level.

In an AKB system of the type described in the aforementioned Hinn patent, control circuits respond to a periodically derived pulse signal with a magnitude representative of the cathode black current level. The derived signal exhibits a level other than zero when the black current level is correct, and different levels (e.g., more or less positive) when the black current level is too high or too low. The derived signal is processed by control circuits including clamping and sampling networks for developing a kinescope bias correction signal which increases or decreases in magnitude and is coupled to the kinescope for maintaining a correct black current level.

If the electron guns of the kinescope are identical whereby they exhibit the same conduction characteristics (e.g., signal gain), they will conduct equal black level currents and will exhibit equal cut-off voltages (i.e., grid-to-cathode voltages) for correct black current conditions. As a practical matter, however, the electron guns often exhibit mutually different conduction characteristics due to manufacturing tolerances, for example. Thus when a receiver is initially aligned during receiver manufacture to produce a correct black image display condition, the electron guns can conduct currents which, although different in magnitude, nevertheless correspond to correct black image currents. Associated with such different black currents are electron gun cut-off voltages which, although mutually different in magnitude, correspond to correct cut-off voltages.

It is herein recognized that an AKB system employed in conjunction with a kinescope which may exhibit dissimilar electron gun conduction characteristics should maintain the black current levels and associated cut-off voltages which correspond to a correct black image current condition, even though such black current levels and associated cut-off voltages are mutually different from one electron gun to another. Such black current level and associated cut-off voltage relationship's should be maintained automatically. The AKB system should operate to properly correct kinescope bias, however, when the initially established black level electron gun currents change due to a change in the operating parameters of the kinescope because of aging or temperature effects. These objectives are satisfied by the AKB system disclosed herein.

Apparatus according to the present invention is included in a video signal processing system including a color kinescope with plural electron guns each having a cathode intensity control electrode and an associated control grid electrode energized in common with respect to the plural cathodes. The electron guns are subject to exhibiting mutually dissimilar conduction characteristics. The system also includes means for establishing initial correct black current levels for the electron guns, with corresponding initial cathode potentials, the initial correct cathode black current levels and the corresponding cathode potentials being subject to exhibiting mutual dissimilarities. The kinescope bias is controlled automatically by means of a signal deriving network and a control network. The signal deriving network derives signals respectively representative of electron gun black current variations produced in accordance with changes in the operating parameters of the kinescope. The control network responds to the magnitudes of both respective derived signals and initial cathode potentials for providing respective bias control signals to respective electron guns of the kinescope, to maintain correct black current levels conducted by the electron guns in substantially the same mutual relationship as exhibited by the conduction characteristics of the electron guns.

In accordance with a feature of the invention, auxiliary control signals are provided with a magnitude proportional to the bias of an electron gun during image blanking bias control intervals. The auxiliary signal exhibits a magnitude and sense for negating the response of the control network to the magnitude of the derived signal when the derived signal is representative of a correct black current level.

Figure 1:
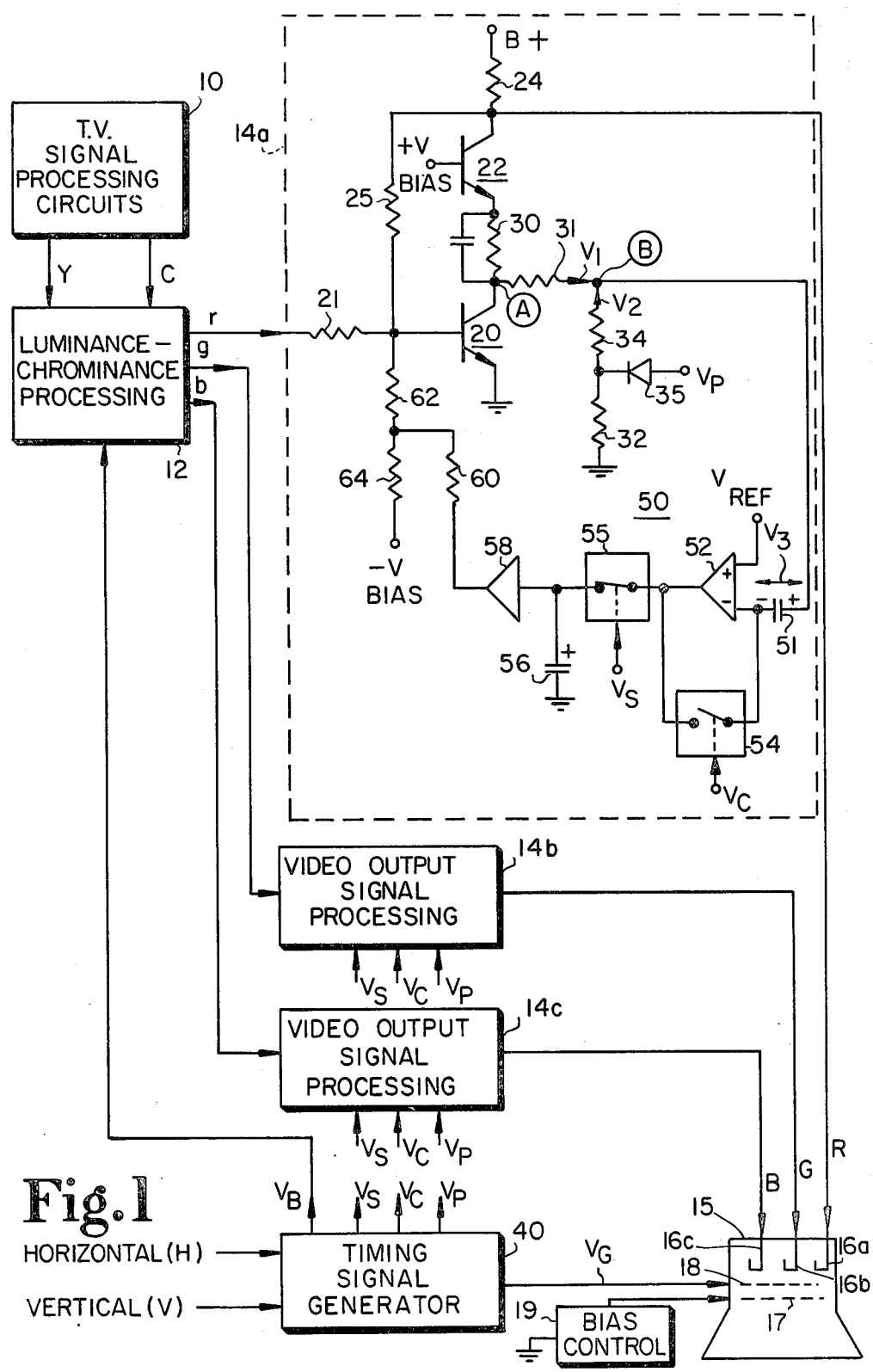
FIG. 1 shows a portion of a color television receiver including an AKB system and associated apparatus embodying the principles of the present invention.

In FIG. 1, television signal processing circuits 10 provide separated luminance (Y) and chrominance (C) components of a composite color television signal to a luminance-chrominance signal processing network 12. Processor 12 includes luminance and chrominance gain control circuits, DC level setting circuits (e.g., comprising keyed black level clamping circuits), color demodulators for developing r-y, g-y and b-y color difference signals, and matrix amplifiers for combining the latter signals with processed luminance signals to provide low level color image representative signals r, g and b. These signals are amplified and otherwise processed by circuits within video output signal processing networks 14a, 14b and 14c, respectively, which supply high level amplified color image signals R, G and B to respective cathode intensity control electrodes 16a, 16b and 16c of a color kinescope 15. Networks 14a, 14b and 14c also perform functions related to the AKB operation, as will be discussed. Kinescope 15 is of the self-converging in-line gun type with a commonly energized control grid 18 associated with each of the electron guns comprising cathode electrodes 16a, 16b and 16c, and a common screen grid 17 also associated with each of the three electron guns. Bias for screen grid 17 is provided by means of an adjustable bias control network 19.

Since output signal processors 14a, 14b and 14c are similar in this embodiment, the following discussion of the operation of processor 14a also applies to processors 14b and 14c.

Processor 14a includes a kinescope driver stage comprising an input common emitter transistor 20 which receives video signal R from processor 12 via an input resistor 21, and an output high voltage common base transistor 22 which together with transistor 20 forms a cascode video driver amplifier. High level video signal R, suitable for driving kinescope cathode 16a, is developed across a load resistor 24 (e.g., 12 kilohms) in the collector output circuit of transistor 22. An operating supply voltage for amplifier 20,22 is provided by a source of high DC voltage B+ (e.g., +230 volts). Direct current negative feedback for driver 20, 22 is provided by means of a resistor 25 (e.g., 130 kilohms). The signal gain of cascode amplifier 20, 22 is primarily determined by the ratio of the value of feedback resistor 25 to the value of input resistor 21. The feedback network provides a suitably low amplifier output impedance, and assists to stabilize the DC operating level at the amplifier output.

A sensing resistor 30 DC coupled in series with and between the collector-emitter paths of transistors 20, 22 serves to develop a voltage, at a relatively low voltage sensing node A, representing the level of kinescope cathode black current conducted during kinescope blanking intervals. Resistor 30 functions in conjunction with the AKB system of the receiver, which will now be described.

A timing signal generator 40 containing logic control circuits responds to periodic horizontal synchronizing rate signals (H) and to periodic vertical synchronizing rate signals (V), both derived from deflection circuits of the receiver, for generating timing signals $V_B$, $V_S$, $V_C$, $V_P$ and $V_G$ which control the operation of the AKB function during periodic AKB intervals. Each AKB interval begins shortly after the end of the vertical retrace interval within the vertical blanking interval, and encompasses several horizontal line intervals also within the vertical blanking interval and during which video signal image information is absent. These timing signals are illustrated by the waveforms in FIG. 2.

Figure 2:
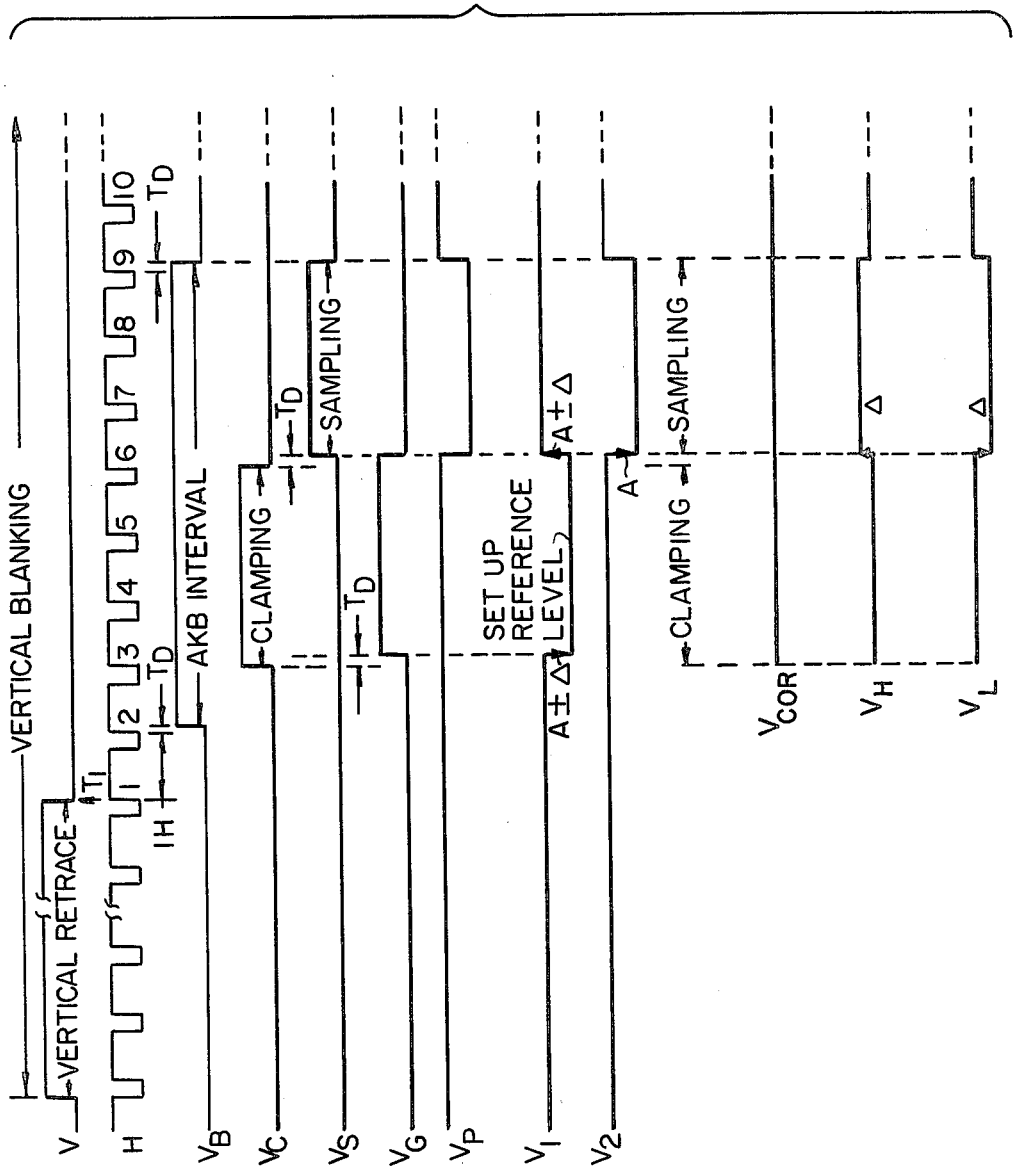
FIG. 2 illustrates signal waveforms associated with the operation of the system of FIG. 1.

Referring to FIG. 2 for the moment, timing signal $V_B$, a video blanking signal, comprises a positive pulse generated soon after the vertical retrace interval ends at time $T_1$, as indicated by reference to signal waveform V. Blanking signal $V_B$ exists for the duration of the AKB interval and is applied to a blanking control input terminal of luminance-chrominance processor 12 for causing the r, g and b outputs of processor 12 to exhibit a black image representative DC reference level corresponding to the absence of video signals. This can be accomplished by reducing the signal gain of processor 12 to substantially zero via the gain control circuits of processor 12 in response to signal $V_B$, and by modifying the DC level of the video signal processing path via the DC level control circuits of procesor 12 to produce a black image representative reference level at the signal outputs of processor 12. Timing signal $V_G$, a positive grid drive pulse, encompasses three horizontal line intervals within the vertical blanking interval. Timing signal $V_C$ controls the operation of a clamping circuit associated with the signal sampling function of the AKB system. Timing signal $V_S$, a sampling control signal, occurs after signal $V_C$ and serves to time the operation of a sample and hold circuit which develops a DC bias control signal for controlling the kinescope cathode black current level. Signal $V_S$ encompasses a sampling interval the beginning of which is slightly delayed relative to the end of the clamping interval encompassed by signal $V_C$, and the end of which substantially coincides with the end of the AKB interval. A negative-going auxiliary pulse $V_P$ coincides with the sampling interval. Signal timing delays $T_D$ indicated in FIG. 2 are on the order of 200 nanoseconds.

Referring again to FIG. 1, during the AKB interval positive pulse $V_G$ (e.g., on the order of +10 volts) forward biases grid 18 of the kinescope, thereby causing the electron gun comprising cathode 16a and grid 18 to increase conduction. At times other than the AKB intervals, signal $V_G$ provides the normal, less positive, bias for grid 18. In response to positive grid pulse $V_G$, a similarly phased, positive current pulse appears at cathode 16a during the grid pulse interval. The amplitude of the cathode output current pulse so developed is proportional to the level of cathode black current conduction (typically a few microamperes).

The induced positive cathode output pulse appears at the collector of transistor 22, and is coupled to the base input of transistor 20 via resistor 25, causing the current conduction of transistor 20 to increase proportionally while the cathode pulse is present. The increased current conducted by transistor 20 causes a voltage to be developed across sensing resistor 30. This voltage is in the form of a negative-going voltage change which appears at sensing node A and which is proportional in magnitude to the magnitude of the black current representative cathode output pulse. The magnitude of the voltage change at node A is determined by the product of the value of resistor 30 (e.g., 560 ohms) times the magnitude of the incremental current flowing through resistor 30.

The voltage change at node A is coupled via a small resistor 31 to a node B at which a voltage change $V_1$, essentially corresponding to the voltage change at node A, is developed. Node B is coupled to a bias control voltage processing network 50. Network 50 includes an input coupling capacitor 51, an input clamping and sampling operational amplifier 52 (e.g., an operational transconductance amplifier) with an associated feedback switch 54 responsive to clamping timing signal $V_C$, and an average responding charge storage capacitor 56 with an associated switch 55 responsive to sampling timing signal $V_S$. The voltage developed on capacitor 56 is used to supply a kinescope bias correction signal via network 58 and resistor network 60, 62, 64 to the kinescope driver via a bias control input at the base of transistor 20. Network 58 includes signal translating and buffer circuits for supplying the bias control voltage at a suitable level and low impedance in accordance with the bias control input requirements of transistor 20.

The operation of the system of FIG. 1 will now be discussed with specific reference to the waveforms of FIG. 2. Auxiliary signal $V_P$ is applied to circuit node B in FIG. 1 via a diode 35 and a voltage translating impedance network comprising resistors 32 and 34, e.g., with values of 220 kilohms and 270 kilohms, respectively. Signal $V_P$ exhibits a positive DC level of approximately +8.0 volts at all times except during the AKB sampling interval, for maintaining diode 35 conductive so that a normal DC bias voltage is developed at node B. When the positive DC component of signal $V_P$ is present, the junction of resistors 32 and 34 is clamped to a voltage equal to the positive DC component of signal $V_P$, minus the voltage drop across diode 35. Signal $V_P$ manifests a negative-going, less positive fixed amplitude pulse component during the AKB sampling interval. Diode 35 is rendered non-conductive in response to negative pulse $V_P$, causing both resistors 32 and 34 to be coupled between node B and ground. Resistor 31 causes insignificant attenuation of the voltage change developed at node A relative to the corresponding voltage change ($V_1$) developed at node B since the value of resistor 31 (on the order of 200 ohms) is small relative to the values of resistors 32 and 34.

Prior to the clamping interval, but during the AKB interval, the pre-existing nominal DC voltage ($V_{DC}$) appearing at node B charges the positive terminal of capacitor 51. During the clamping interval when grid drive pulse $V_G$ is developed, the voltage at node A decreases in response to pulse $V_G$ by an amount representative of the black current level. This causes the voltage at node B to decrease to a level substantially equal to $V_{DC}-V_1$. Also during the clamping interval, timing signal $V_C$ causes clamping switch 54 to close (i.e., conduct) whereby the inverting (−) signal input of amplifier 52 is coupled to its output, thereby configuring amplifier 52 as a unity gain follower amplifier. As a result, a source of fixed DC reference voltage $V_{REF}$ (e.g., +5 volts) applied to a non-inverting input (+) of amplifier 52 is coupled by feedback action to the inverting signal input of amplifier 52 via the output of amplifier 52 and conductive switch 54. Thus during the clamping interval the voltage $V_3$ across capacitor 51 is a function of a reference set-up voltage determined by volta $V_{REF}$ at the negative terminal of capacitor 51, and a voltage at the positive terminal of capacitor 51 corresponding to the difference between the described pre-existing nominal DC level ($V_{DC}$) at node B and voltage change $V_1$ developed at node B during the clamping interval. Thus voltage $V_3$ across capacitor 51 during the clamping reference interval is a function of the level of black current representative voltage change $V_1$, which may vary. Voltage $V_3$ can be expressed as $(V_{DC}-V_1)-V_{REF}$.

During the immediately following sampling interval, positive grid drive pulse $V_G$ is absent, causing the voltage at node B to increase positively to the pre-existing nominal DC level $V_{DC}$ that appeared prior to the clamping interval. Simultaneously, negative pulse $V_P$ appears, reverse biasing diode 35 and perturbing (i.e., momentarily changing) the normal voltage translating and coupling action of resistors 32, 34 such that the voltage at node B is reduced by an amount $V_2$ as indicated in FIG. 2. At the same time, clamping switch 54 is rendered non-conductive and sampling switch 55 closes (conducts) in response to signal $V_S$ whereby charge storage capacitor 55 is coupled to the output of amplifier 52.

Thus during the sampling interval the input voltage applied to the inverting signal input (−) of amplifier 52 is equal to the difference between the voltage at node B and voltage $V_3$ across input capacitor 51. The input voltage applied to amplifier 52 is a function of the magnitude of voltage change $V_1$, which can vary with changes in the kinescope black current level.

The voltage on output storage capacitor 56 remains unchanged during the sampling interval when the magnitude of voltage change $V_1$ developed during the clamping interval equals the magnitude of voltage change $V_2$ developed during the sampling interval, indicating a correct kinescope black current level. This results because during the sampling interval, voltage change $V_1$ at node B increases in a positive direction (from the clamping set-up reference level) when the grid drive pulse is removed, and voltage change $V_2$ causes a simultaneous negative-going voltage perturbation at node B. When kinescope bias is correct, positive-going voltage change $V_1$ and negative-going voltage change $V_2$ exhibit equal magnitudes whereby these voltage changes mutually cancel during the sampling interval, leaving the voltage at node B unchanged.

When the magnitude of voltage change $V_1$ is less than the magnitude of voltage change $V_2$, amplifier 52 proportionally charges storage capacitor 56 in a direction for increasing cathode black current conduction. Conversely, amplifier 52 proportionally discharges storage capacitor 56 for causing decreased cathode black current conduction when the magnitude of voltage change $V_1$ is greater than the magnitude of voltage change $V_2$.

As more specifically shown by the waveforms of FIG. 2, the amplitude "A" of voltage change $V_1$ is assumed to be approximately three millivolts when the cathode black current level is correct, and varies over a range of a few millivolts ($\pm \Delta$) as the cathode black current level increases and decreases relative to the correct level as the operating characteristics of the kinescope change. Thus the clamping interval set-up reference voltage across capacitor $V_3$ varies with changes in the magnitude of voltage $V_1$ as the cathode black current level changes. Voltage change $V_2$ at node B exhibits an amplitude "A" of approximately three millivolts, which corresponds to amplitude "A" associated with voltage change $V_1$ when the black current level is correct.

As indicated by waveform $V_{COR}$ in FIG. 2, the voltage at the inverting input of amplifier 52 remains unchanged during the sampling interval when voltages $V_1$ and $V_2$ are both of amplitude "A". However, as indicated by waveform $V_H$, the input voltage of amplifier 52 increases by an amount $\Delta$ when voltage change $V_1$ exhibits amplitude "A+$\Delta$", corresponding to a high black current level. In this event amplifier 52 discharges output storage capacitor 56, so that the bias control voltage applied to the base of transistor 20 causes the collector voltage of transistor 22 to increase, whereby the cathode black current decreases toward the correct level.

Conversely, and as indicated by waveform $V_L$, the input voltage of amplifier 52 decreases by an amount $\Delta$ during the sampling interval when voltage change $V_1$ exhibits amplitude "A−$\Delta$", corresponding to a low black current level. In this case amplifier 52 charges output storage capacitor 56, causing the collector voltage of transistor 22 to decrease whereby the cathode black current increases toward the correct level. In either case, several sampling intervals may be required to achieve the correct black current level.

In some AKB systems it may be desirable to develop black current representative voltage change $V_1$ during the sampling interval, rather than during the preceding clamping interval as described previously. In such an alternative system grid drive pulse $V_G$ would be timed to occur during the sampling interval, coincident with a positive auxiliary pulse $V_P$. The negative-going voltage change $V_1$ and the positive-going voltage change $V_2$ developed in response to auxiliary signal $V_P$ than occur simultaneously and combine directly at node B such that they mutually cancel when the black current level is correct (i.e., no voltage change is produced at node B).

The described combined-pulse sampling technique is discussed in greater detail in my concurrently filed copending U.S. patent application Ser. No. 434,314 filed Oct. 14, 1984, titled "Signal Processing Network For An Automatic Kinescope Bias Control System", incorporated herein by reference. This copending application also discloses additional information concerning the arrangement including auxiliary control signal $V_P$, as well as disclosing a suitable arrangement for timing signal generator 40 and circuit details of sampling amplifier 52.

The voltage developed at node B during the AKB clamping and sampling intervals is a function of the values of resistors 31, 32 and 34, and the value of an output impedance $Z_0$ (approximately 30 to 50 ohms) appearing at node A. When signal $V_P$ manifests the positive DC level (+8 volts) such as during the clamping interval, the junction of resistors 32 and 34 is voltage clamped and a current conducted by resistor 31 from node A to node B is a function of the values of $Z_0$, resistor 31 and resistor 34. During the subsequent sampling interval when the negative-going pulse component of signal $V_P$ is present, diode 35 is non-conductive and the junction of resistors 32 and 34 is unclamped. At this time a different current is conducted by resistor 31 from node A to node B as a function of the value of resistor 32, in addition to the values of $Z_0$ and resistors 31, 34. Voltage change $V_2$ developed at node B in response to the negative-going pulse component of signal $V_P$ is proportional to the difference between these currents.

The described AKB system, when employed with a kinescope displaying dissimilar electron gun conduction characteristics, advantageously automatically maintains the black current levels corresponding to a correct black image current condition even though such black current levels are mutually different from one electron gun of the kinescope to another due to manufacturing tolerances, for example. This feature of the disclosed AKB system will now be discussed.

As noted previously, kinescope 15 is of the self-converging type with a single control grid 18 and a single screen grid 17 both common to each of the three kinescope electron guns. The correct black current conduction of the kinescope can be established during receiver manufacture alignment by adjusting the bias of screen grid 17 by means of bias control network 19 (e.g., comprising a manually adjustable potentiometer) until one or more of the kinescope cathodes exhibits a desired voltage.

When the kinescope electron guns are identical whereby they exhibit the same conduction response, they will conduct equal black currents and exhibit equal cut-off voltages (i.e., grid-to-cathode voltages) as a result of the black current alignment process. As a practical matter, however, the electron guns can exhibit mutually different conduction characteristics. Thus the electron guns can conduct currents which, although different in magnitude, nevertheless correspond to correct black image currents. The different cathode cut-off voltages respectively associated with the different currents likewise correspond to correct cut-off voltages.

The described electron gun conduction relationship for correct black image current conditions is preserved because the magnitude of voltage change $V_2$ is related to the DC voltage component appearing at sensing node A during AKB operating intervals (neglecting the effect of the induced cathode output current pulse developed in response to positive grid drive pulse $V_G$). This DC voltage component is proportional to the cathode cut-off bias voltage as manifested by the DC voltage component at the output of driver transistor 22, to which the kinescope cathode is connected.

This relationship is defined by the expression $$V_2 = R_0 \frac{R_{32}}{R_{34}(R_{32} + R_{34})} V_{DC} - \frac{R_0}{R_{34}} (V_P - V_D).$$

where
- $V_2$ is the magnitude of voltage change $V_2$,
- $R_0$ is the sum of the values of resistor 31 and impedance $Z_0$ at node A,
- $R_{32}$ is the value of resistor 32,
- $R_{34}$ is the value of resistor 34,
- $V_{DC}$ is the value of the DC component at node A, on the order of +7 to +10 volts,
- $V_P$ is the fixed positive DC component of auxiliary signal $V_P$, on the order of +8 volts, and
- $V_D$ is the substantially constant DC offset voltage of diode 35, approximately +0.6 volts.

Voltage change $V_2$ exhibits a magnitude of approximately $-3.4$ millivolts when $V_{DC}$ is +8.0 volts, for example.

Thus if the three kinescope electron guns exhibit mutually different currents and associated cut-off voltages corresponding to initial black current set-up conditions, voltage changes $V_2$ respectively associated with signal processors 14a, 14b and 14c each exhibit different magnitudes, even though each is derived from a common signal $V_P$. The different magnitudes of voltage changes $V_2$ are a function of the different cut-off voltages as manifested by the DC components of different magnitudes developed at nodes A. The different magnitudes of voltage changes $V_2$ are such that, for the associated AKB control loop, the voltage developed at node B does not change when voltage changes $V_1$ and $V_2$ are combined. Accordingly, each AKB control loop remains quiescent.

The AKB control loops will remain quiescent until the initially established black currents change due to a change in the operating parameters of the kinescope because of kinescope aging or temperature effects, for example. In this regard assume that the kinescope operating parameters change such that the red electron gun conduction decreases whereby the associated cathode black current is too low. The cathode output current pulse induced in response to positive grid drive pulse $V_G$ will then correspondingly decrease in magnitude, the voltage at node B will change in response to voltage changes $V_1$ and $V_2$, and the voltage on output storage capacitor 56 will change with a sense for reducing the cathode bias voltage developed at the collector of transistor 22 to thereby return (i.e., increase) the cathode black current to the correct level. At this time the magnitude of voltage change $V_2$ will exhibit a new level associated with the newly developed (corrected) cathode bias voltage, such that the voltage at node B remains unchanged in response to voltage changes $V_1$ and $V_2$ (i.e., the AKB control loop is again quiescent).

Figure 3:
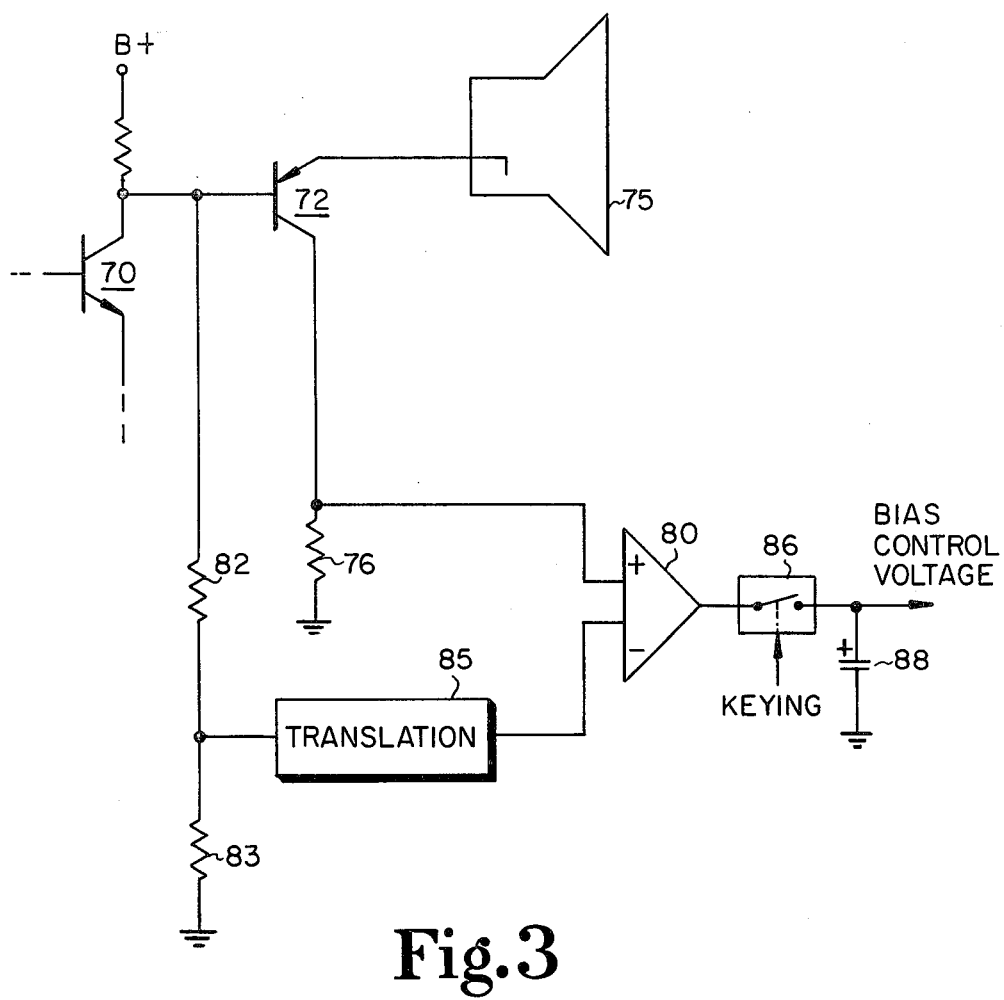
FIG. 3 shows an alternative embodiment of apparatus according to the present invention.

As indicated by the arrangement of FIG. 3 the principles of the present invention are applicable to systems which do not employ the pulsed grid, combined-pulse sampling technique of FIG. 1.

In FIG. 3, the collector output of a video signal amplifier transistor 70 is coupled via a high voltage PNP follower transistor 72 to a cathode of a kinescope 75. During AKB intervals, follower transistor 72 acts as a current sensor for directly sensing the level of the cathode black current, which corresponds to the emitter-collector current of transistor 72. A voltage developed across a resistor 76 is directly proportional to the collector current of transistor 72, which corresponds to the cathode black current. A voltage divider comprising resistors 82, 83 is coupled to the collector output of transistor 70, for developing a voltage at the junction of resistors 82, 83 proportional to the cathode cut-off bias voltage associated with the correct black current level established during receiver alignment.

The black current representative voltage developed across resistor 76 is applied to one input of a differential input amplifier. The cut-off voltage representative voltage developed across resistor 83 is coupled via a voltage translation network 85 (e.g., including level shifting circuits) to another input of differential amplifier 80. A sampling switch 86 closes (conducts) in response to KEYING signals during AKB sampling signals for coupling the output of amplifier 80 to a charge storage capacitor 88. A bias correction voltage developed on capacitor 88 is a function of the voltages across resistors 76 and 83, and is applied to the kinescope (e.g., via transistor 70) for maintaining a correct kinescope black current level. Here, the "reference" input to amplifier 80, as developed from the voltage across resistor 83, is proportional to the cathode black level cut-off bias voltage.

What is claimed is:

1. In a video signal processing system including an image reproducing device having an electron gun comprising an intensity control electrode, automatic bias control apparatus comprising:
    means for deriving a signal representative of the magnitude of black image current conducted by said electron gun during bias control intervals;
    means for providing an auxiliary signal proportional to the bias of said electron gun during image blanking bias control intervals;
    control means, responsive to said derived signal and to said auxiliary signal, for developing a bias control voltage as a function of the magnitudes of both said derived signal and said auxiliary signal; and
    means for coupling said control signal to said image reproducing device for maintaining a correct black current level.

2. Apparatus according to claim 1, wherein
    said image reproducing device comprises a kinescope with plural electron guns each having a cathode intensity control electrode and an associated grid electrode energized in common with respect to said plural cathode electrodes, said electron guns being subject to exhibiting mutually dissimilar conduction characteristics; and wherein
    said system includes plural automatic bias control apparatus each respectively associated with respective ones of said plural electron guns.

3. Apparatus according to claim 2, wherein
    said auxiliary signal exhibits a magnitude and sense for substantially negating the response of said control means to said magnitude of said derived signal when the magnitude of said derived signal is representative of a correct black current level.

4. Apparatus according to claim 3, wherein
    said derived signal exhibits a magnitude other than zero when said black current level is correct.

5. Apparatus according to claim 4, and further comprising:
    means for modifying the bias of said kinescope grid electrode during bias control intervals to induce respective cathode output current signals with magnitudes proportional to the black current level conducted by the associated electron gun.

6. In a color television receiver including a color image reproducing device with plural electron guns each having a cathode intensity control electrode for receiving video signals and an associated control grid electrode energized in common with respect to said plural cathodes, said electron guns being subject to exhibiting mutually dissimilar conduction characteristics; and means for establishing initial correct black current levels for said electron guns with corresponding initial cathode potentials, said initial correct cathode black current levels and corresponding cathode potentials being subject to exhibiting mutual dissimilarities; apparatus for automatically controlling the bias of said image reproducing device in response to changes in the operating parameters of said image reproducing device, comprising:
    means for deriving signals respectively representative of electron gun black current variations produced in accordance with changes in the operating parameters of said image reproducing device; and
    control means responsive to the magnitudes of both respective derived signals and initial cathode potentials for providing respective bias control signals to respective electron guns of said image reproducing device to maintain correct black current levels conducted by said electron guns in substantially the same mutual relationship as exhibited by the conduction characteristics of said electron guns.

7. Apparatus according to claim 6, wherein
    said image reproducing device includes an additional grid electrode energized in common with respect to said plural cathodes; and
    said means for establishing said initial correct black current levels for said electron guns comprises a source of variable bias potential coupled to said additional grid electrode.

8. Apparatus according to claim 6, and further comprising
    means for modifying the bias of said control grid during bias control intervals to induce respective cathode output currents with magnitudes proportional to the black current level conducted by the associated electron gun.

* * * * *